(12) United States Patent
Gavrilov et al.

(10) Patent No.: US 7,774,310 B2
(45) Date of Patent: Aug. 10, 2010

(54) CLIENT-SPECIFIC TRANSFORMATION OF DISTRIBUTED DATA

(75) Inventors: Dmitri Gavrilov, Redmond, WA (US); Xin He, Sammamish, WA (US); Sanjeev Balarajan, Bellevue, WA (US); Nathan Muggli, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/741,521

(22) Filed: Apr. 27, 2007

(65) Prior Publication Data

US 2008/0270413 A1 Oct. 30, 2008

(51) Int. Cl.
G06F 17/30 (2006.01)

(52) U.S. Cl. .................. 707/636; 707/770; 370/342; 375/152

(58) Field of Classification Search .......... None
See application file for complete search history.

(56) References Cited

U.S. PATENT DOCUMENTS

| | | | |
|---|---|---|---|
| 6,044,466 A | 3/2000 | Anand | |
| 6,336,186 B1 | 1/2002 | Dyksterhouse | |
| 6,393,473 B1 | 5/2002 | Chu | |
| 6,463,470 B1 * | 10/2002 | Mohaban et al. | 709/223 |
| 6,697,857 B1 | 2/2004 | Dixon | |
| 6,950,818 B2 * | 9/2005 | Dennis et al. | 707/3 |
| 7,013,332 B2 | 3/2006 | Friedel | |
| 7,065,616 B2 | 6/2006 | Gajjar | |
| 7,181,761 B2 | 2/2007 | Davis | |
| 7,398,308 B2 * | 7/2008 | Friedel et al. | 709/223 |
| 2004/0111519 A1 | 6/2004 | Fu | |
| 2004/0204949 A1 * | 10/2004 | Shaji et al. | 705/1 |
| 2004/0215650 A1 | 10/2004 | Shaji | |
| 2005/0193222 A1 * | 9/2005 | Greene | 713/201 |
| 2006/0167858 A1 | 7/2006 | Dennis | |
| 2006/0168257 A1 * | 7/2006 | Friedel et al. | 709/229 |
| 2006/0174320 A1 | 8/2006 | Maru et al. | |
| 2007/0006278 A1 * | 1/2007 | Avram et al. | 726/1 |

OTHER PUBLICATIONS

Damianou et al., "Tools for Domain-based Policy management of Distributed Systems," IEEE/IFIP Network Operations and Management Symposium (NOMS2002), Florence, Italy, Apr. 15-19, 2002.
Ponnappan et al., "A Policy Based QoS Management System for the IntServ/DiffServ Based Internet," Proceedings of the Third International Workshop on Policies for Distributed Systems and Networks (Policy '02) © 2002 IEEE Computer Society.
Seamons et al., "Protecting Privacy During On-Line Trust Negotiation," (admitted prior art as of the filing date of the present application.).

* cited by examiner

*Primary Examiner*—Don Wong
*Assistant Examiner*—Shyue Jiunn Hwa
(74) *Attorney, Agent, or Firm*—Merchant & Gould P.C.

(57) ABSTRACT

A data store is distributed between a server and a client. The distributed data store includes global data. A transformation is applied to the global data to generate client-specific data based on the global data. The client-specific data is stored on the client which uses the client-specific data to perform tasks relating to the client-specific data.

19 Claims, 8 Drawing Sheets

CLIENT-SPECIFIC TRANSFORMATION OF DISTRIBUTED DATA

BACKGROUND

Data distribution is used to distribute data among multiple data stores or among various locations. One such type of data distribution is referred to as replication. In broad terms, replication involves copying data from one data store to other data stores, such that each of the data stores contains the same data.

Distributed data stores provide a number of benefits over non-distributed data stores. One of the benefits is that the risk of data loss is greatly diminished. If a single server or data store goes down, any of the other data stores are available to provide access to the distributed data. Another benefit of a distributed data store is that the data can be made widely available. For example, information that is needed by everyone in an organization, such as an employee directory, may be made accessible to all employees by replicating the employee directory among various sites.

One example of a distributed data store is the Microsoft® Active Directory® directory service. In such a directory service, data may be distributed between computing systems referred to as domain controllers. When data is modified on one of the domain controllers, the directory service may be configured to replicate that data to other domain controllers. One of the benefits of a directory service is that it simplifies the task of administering security policies in a computer network. Rather than requiring the network administrator to individually set and maintain security policies on each computing system in the network, the directory service enables security policies to be distributed throughout the network. When a change is made to a security policy, a copy of the security policy is replicated between the other domain controllers within the network. In this way a global policy may be defined and maintained that is the same throughout the organization.

SUMMARY

Embodiments of the present disclosure generally relate to the transformation of global data into client-specific data. In one non-limiting example, global data stored in a global data store is transformed into client-specific data, which is stored in a local data store of a client. Further embodiments relate to a transformation of global policy data into client-specific policy data.

As discussed herein, an aspect of some embodiments relates to a system including a server. The server is communicatively connected to a global data store. The global data store contains global data. The server is operative to communicate with a client having a local data store that stores client-specific data generated by applying a transformation rule to the global data.

Another aspect of some embodiments relates to a computer readable medium containing computer executable instructions which when executed by a computer perform a method of generating client-specific data. The method includes defining global data; defining transformation rules, each transformation rule including a scope, a priority, and a transformation; applying the transformation rules to the global data in an order corresponding to the priority to generate client-specific data; and storing the client-specific data on a client that is within the scope of the transformation rules.

Further aspects relate to a directory service database including a first domain controller and a second domain controller. The first domain controller has a global data store containing global policy data, wherein the first domain controller distributes the global policy data. The second domain controller stores transformed global policy data, wherein the transformed global policy data is generated by applying a transformation rule to the global policy data.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to the transformation of global data into client-specific data. In one non-limiting example, global data stored in a global data store is transformed into client-specific data, which is stored in a local data store of a client. Further embodiments relate to a transformation of global policy data into client-specific policy data.

Figure 1:
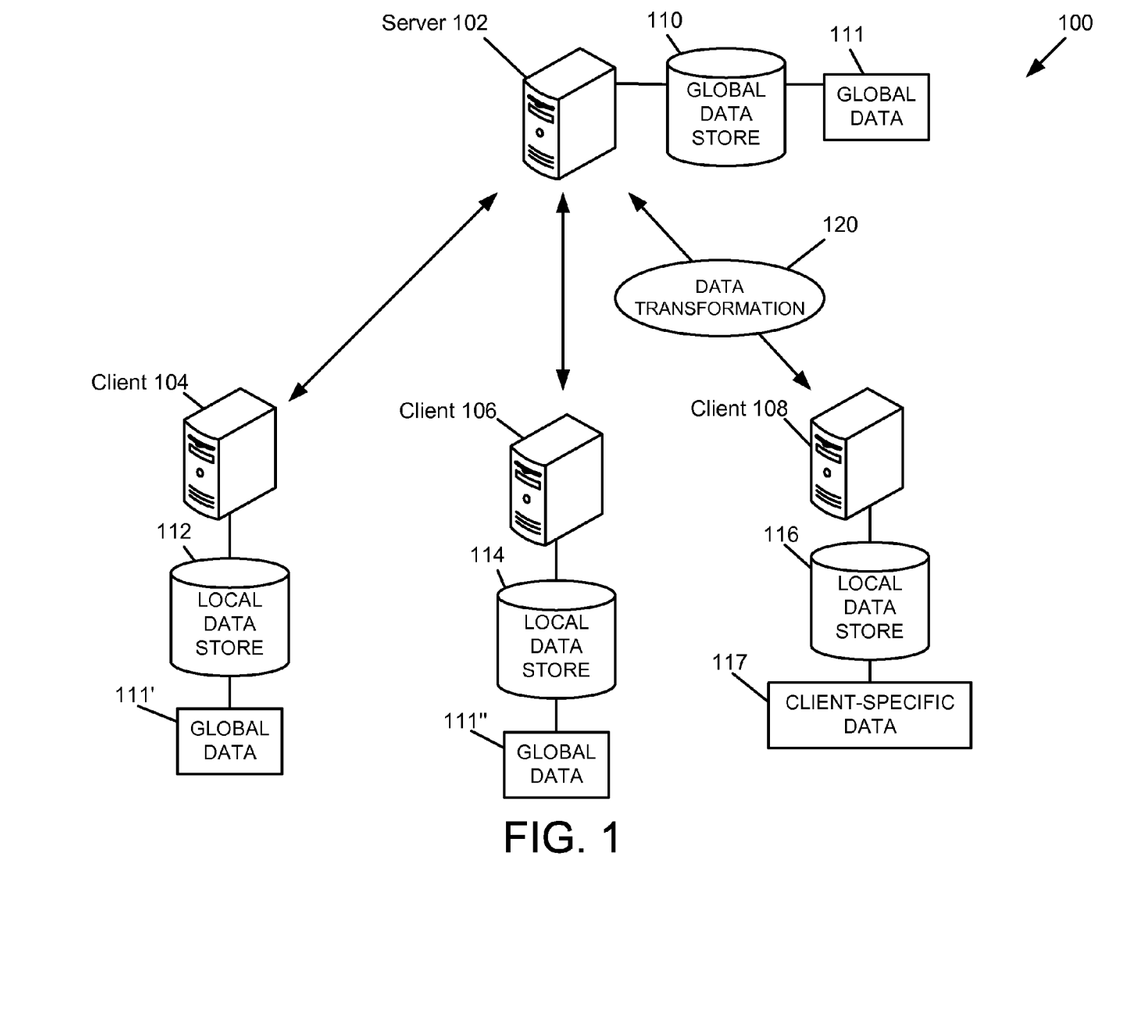
FIG. 1 is a block diagram of an example client-server system capable of implementing aspects of the present disclosure.

FIG. 1 is a block diagram of an example client-server system 100. Client-server system 100 includes server 102, and a plurality of clients 104, 106, and 108. Server 102 includes global data store 110 having global data 111. Clients 104, 106, and 108 include local data stores 112, 114, and 116. Local data stores 112 and 114 include global data 111' and 111" respectively. Local data store 116 includes client-specific data 117. In one embodiment, global data store 110 is replicated from server 102 to local data stores 112 and 114 of clients 104, 106, such that local data stores 112 and 114 contain copies of global data 111. As described in more detail herein, global data store 110 is also replicated to local data store 116 of client 108, except that data transformation 120 is first applied to global data 111 to generate client-specific data 117. In this way, global data 111 may be customized to suit the particular needs of client 108.

In the illustrated embodiment, when global data 111 is distributed to clients, such as to client 104, copy of global data 111' is stored on local data store 112. Having an exact copy of global data 111 is useful in many circumstances. However, there are times when it is desirable to modify global data 111 for a particular client, or set of clients. Some embodiments of the present disclosure enable this data transformation to generate client-specific data from global data.

In one example, server 102 and clients 104 and 106 all reside in the same general location, but client 108 is located in a different time zone. Data replicated to local data store 116 can be transformed, such that times stored within global data 111 are adjusted for the different time zone. In order for this to occur, data transformation 120 is applied to global data 111 to modify the dates and times as desired into client-specific data 117.

In another example, global data store 110 includes a list of globally authorized administrators. The administrators are granted special permissions within client-server system 100 to access and modify the system. When global data store 110 is replicated to clients 104 and 106, the globally authorized administrators are granted administrative access to those clients. Clients 104 and 106 contain an exact copy of global data store 110, which cannot be modified, for example, to authorize a local administrator to have access only to client 104.

If such a modification is desired, however, data transformation 120 can be applied to global data 111 to generate client-specific data 117 based on global data 111, such as to include the additional administrator. Client-specific data 117 is stored in local data store 116 of client 108. In this example, the local administrator is only granted access to client 108, and not to server 102, client 104, or client 106, as desired.

Figure 2:
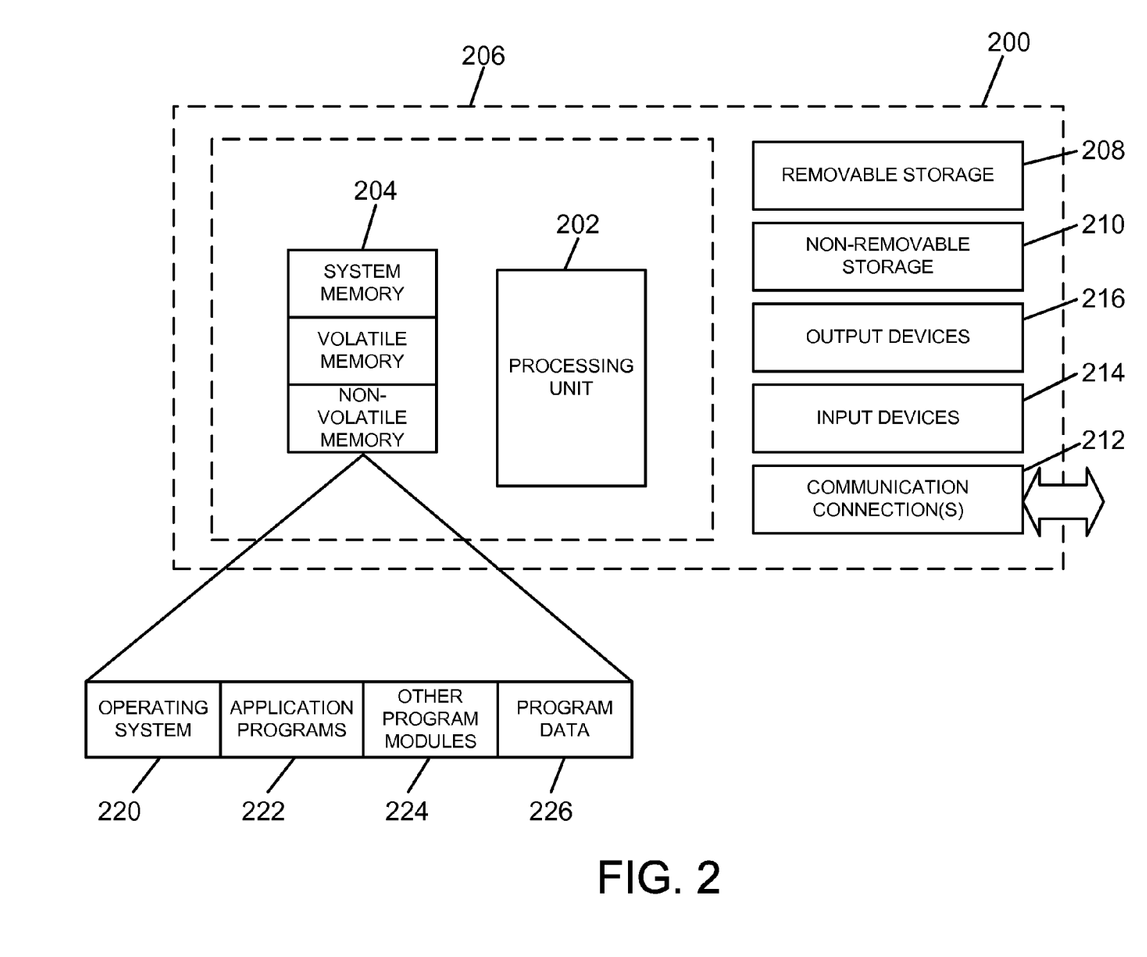
FIG. 2 depicts an exemplary computing system upon which aspects of the present disclosure may be implemented.

FIG. 2 is an exemplary computing system 200 for implementing aspects of the present disclosure. In one embodiment, computing system 200 is client 108, shown in FIG. 1. In another possible embodiment, computing system 200 is server 102, also shown in FIG. 1. In its most basic configuration, computing system 200 typically includes at least one processing unit 202 and memory 204. Depending on the exact configuration and type of computing system, memory 204 can be volatile (such as RAM), non-volatile (such as ROM, flash memory, etc.) or some combination of the two. This most basic configuration is illustrated in FIG. 2 by dashed line 206. Additionally, computing system 200 may also have additional features/functionality. For example, computing system 200 may also include additional storage (removable and/or non-removable) including, but not limited to, magnetic or optical disks or tape. Such additional storage is illustrated in FIG. 2 by removable storage 208 and non-removable storage 210.

Computing system 200 typically includes at least some form of computer readable media. Computer readable media can be any available media that can be accessed by computing system 200. By way of example, and not limitation, computer readable media may comprise computer storage media and communication media. Computer storage media includes volatile and nonvolatile, removable and non-removable media implemented in any method or technology for storage of information such as computer readable instructions, data structure, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Any such computer storage media may be part of computing system 200.

Computing system 200 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

In some embodiments, memory 204 includes one or more of operating system 220, application programs 222, other program modules 224, and program data 226. In some embodiments, global data, client-specific data, and transformation rules may each be stored in memory 204, removable storage 208, non-removable storage 210, or any other computer storage media described herein.

Figure 3:
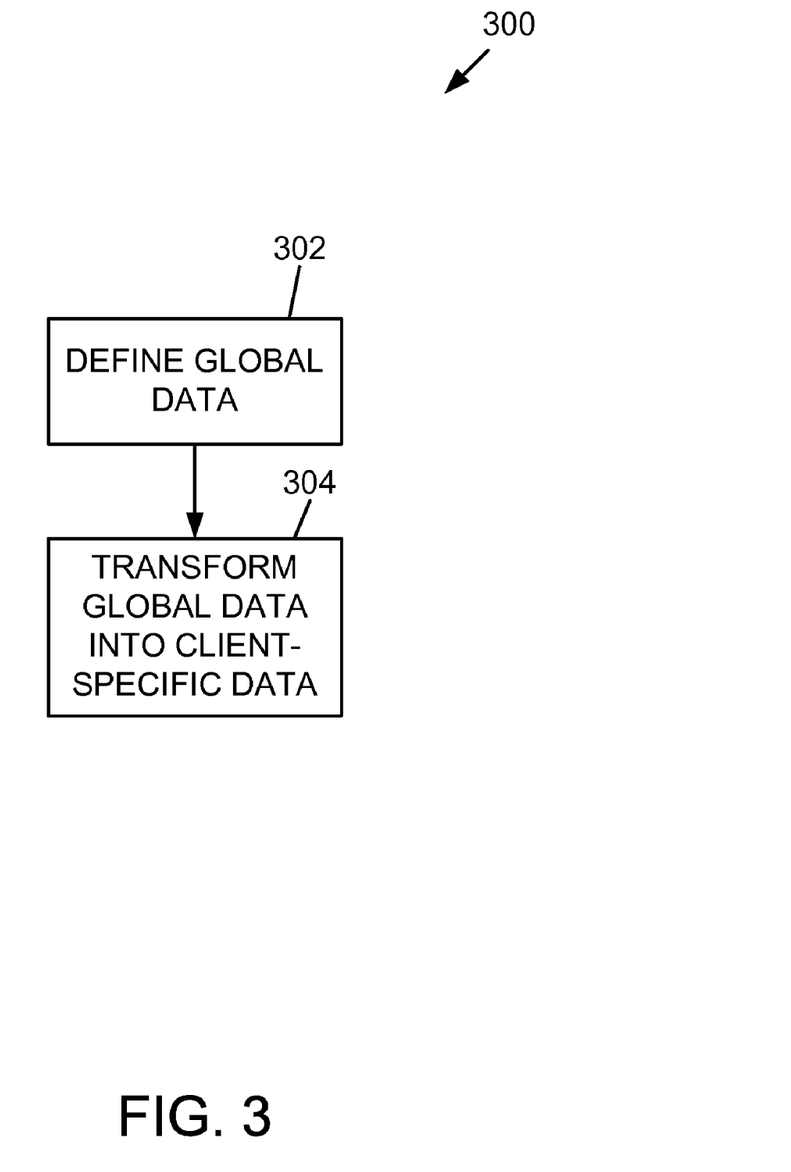
FIG. 3 is a flow chart illustrating an example method of generating client-specific data.

FIG. 3 is a flow chart illustrating an example method 300 of generating client-specific data. Method 300 includes operation 302 and operation 304. Method 300 begins with operation 302, during which global data is defined. In one embodiment, defining global data includes installing software on a computing system. In another embodiment, defining global data includes configuring a global policy. In one possible embodiment, the global policy is a set of rules that govern the interaction between a subject and an object. In some embodiments, the global policy is distributed around the network to provide a common set of rules throughout the network. An example of a global policy is a policy that defines security and access rights relating to objects within the network. In another embodiment, defining global data includes defining a set of global administrators. In one embodiment, the set of global administrators is a list of all users having administrative access rights within the network. In this example, the list of global administrators enables a user on the list of global administrators to be authorized as administrators by any computer which utilizes the list of global administrators to determine access rights. In some possible embodiments, defining global data is performed by a server (e.g., 102 shown in FIG. 1) or by another computing device capable of communicating with the server (e.g., 108 shown in FIG. 1).

After global data has been defined, operation 304 is then performed. During operation 304 the global data is transformed into client-specific data. In possible embodiments, transformation of global data includes adding data to the global data, removing data from the global data, overriding some or all of the global data, or otherwise modifying the global data.

In one embodiment, one or more transformation rules are defined to identify the transformations that should be applied to the global data. Transformation rules can be defined to perform any desired data transformation. One example is adding a local administrator to a list of global administrators. Transformations may also be used to override data or remove data. For example, a transformation rule may be defined to remove a particular administrator from the list of global administrators, such as to deny that administrator access to the client. Alternatively, a transformation rule may be defined to override the list of global administrators with a list of local administrators. In this example, none of the global administrators would be permitted to access the client unless they were also on the list of local administrators. Additional embodiments of transformation rules are illustrated and described with reference to FIG. 8.

Example embodiments described herein enable client-specific changes to be made to global data, to modify the global data to conform to the specific needs of a particular client.

Figure 4:
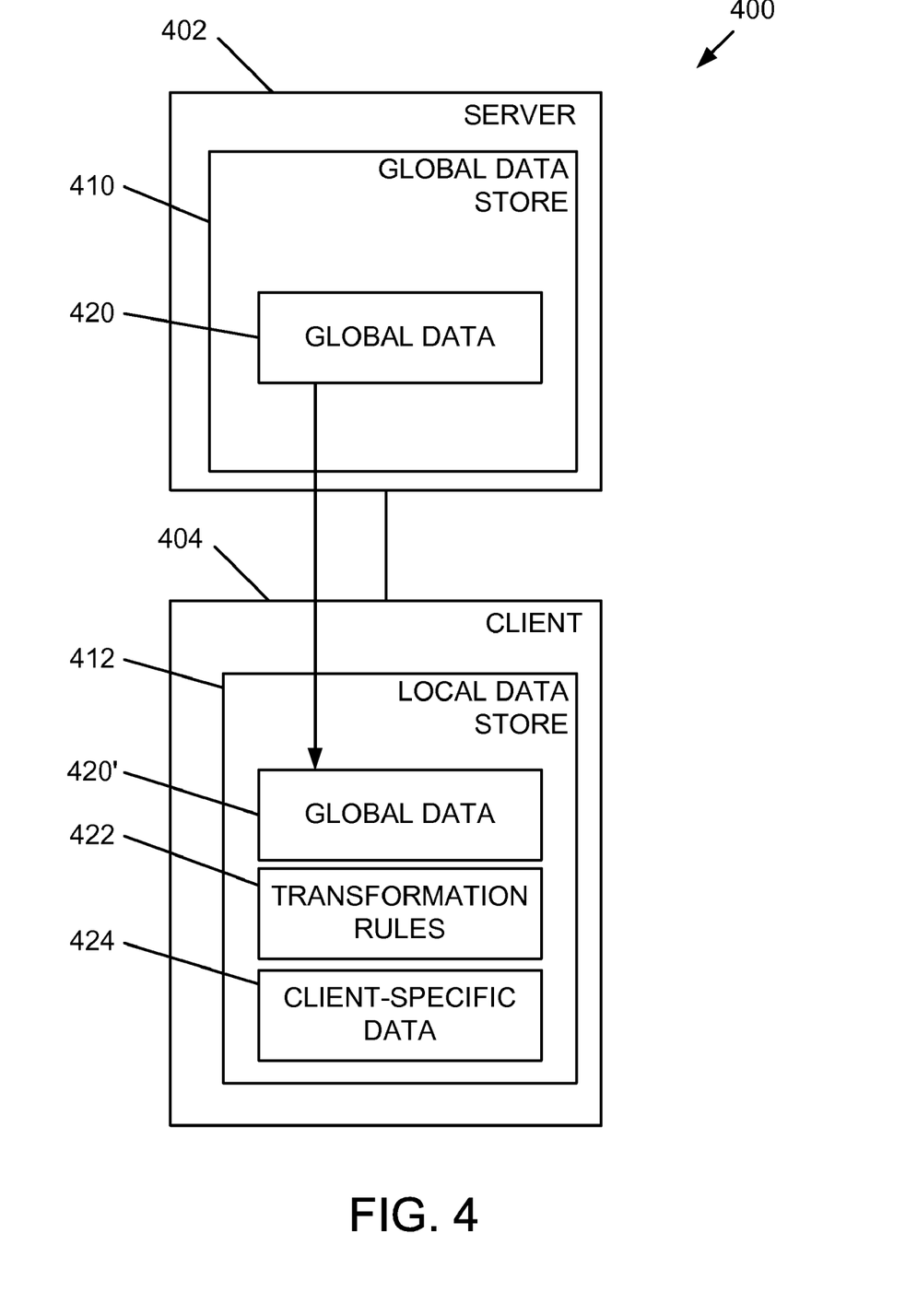
FIG. 4 is a block diagram of an example client-server system capable of performing the method shown in FIG. 3.

FIG. 4 is a block diagram of an example client-server system 400 capable of performing method 300, described with reference to FIG. 3. Client-server system 400 includes server 402 and client 404. Server 402 includes global data store 410 having global data 420. Client 404 includes local data store 412 having global data 420', transformation rules 422, and client-specific data 424.

In the illustrated embodiment, global data 420 is defined and stored in global data store 410. Global data 420 is then replicated to client 404, such that local data store 412 includes a copy of global data 420'.

Transformation rules 422 are defined and stored in local data store 412. In possible embodiments, transformation rules 422 include one or more rules that define a transformation to be applied to global data 420 in order to generate client-specific data 424.

After global data 420' and transformation rules 422 have been defined and stored in local data store 412, client 404 reads transformation rules 422 and applies transformation rules 422 to global data 420 to generate client-specific data 424. Client 404 then uses client-specific data 424 to perform tasks relating to the client-specific data. For example, if client-specific data 424 contains data relating to access rights, client 404 will read client-specific data 424 to determine access rights. One of the benefits of this embodiment is that transformation data does not need to be stored in global data 420. In this way, global data 420 occupies less space in the memory of server 402 and any other computing system onto which global data 420 is replicated.

Figure 5:
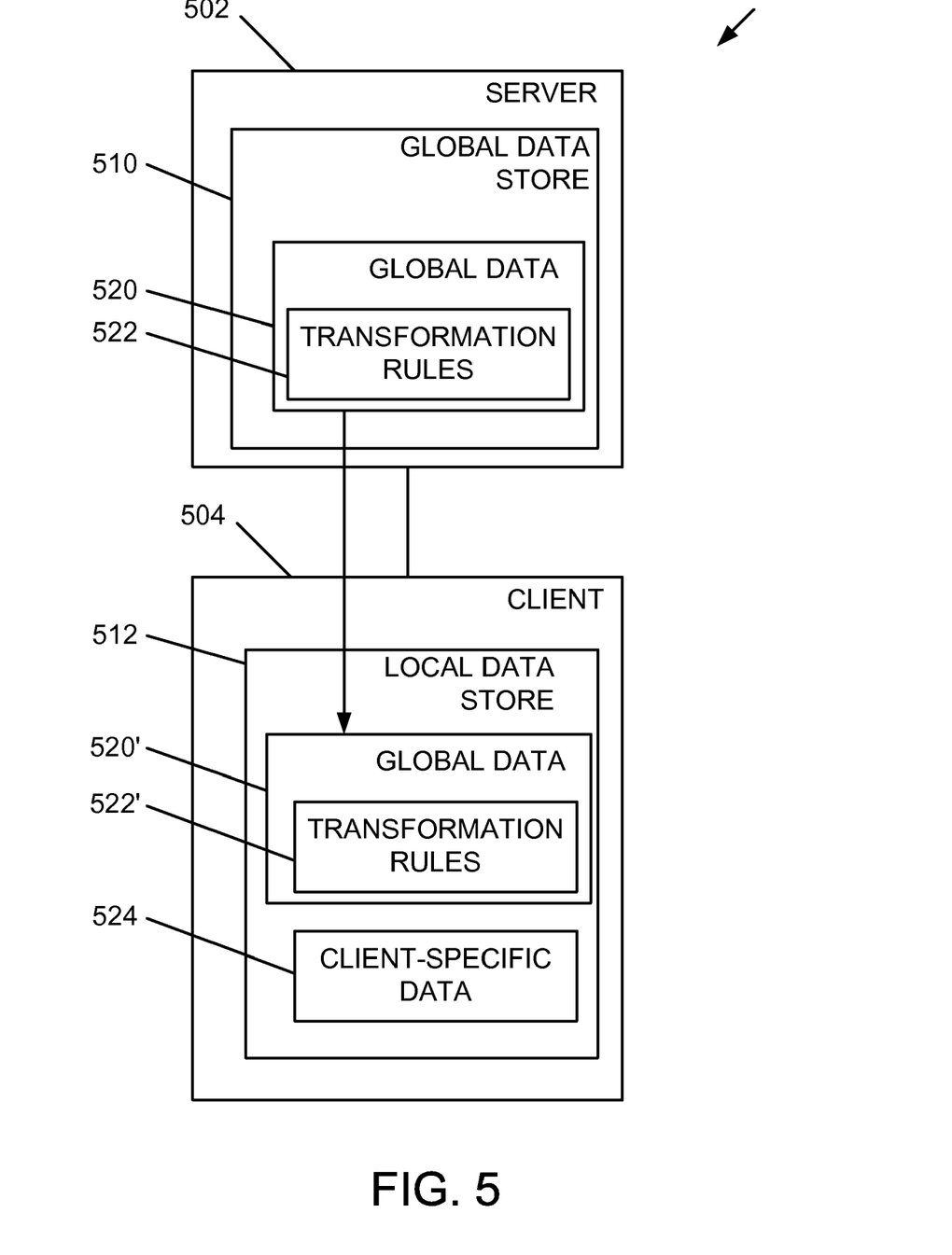
FIG. 5 is a block diagram of another example client-server system capable of performing the method shown in FIG. 3.

FIG. 5 is a block diagram illustrating another example client-server system 500 capable of performing method 300, described with reference to FIG. 3. Client-server system 500 includes server 502 and client 504. Server 502 includes global data store 510 having global data 520. Global data 520 includes transformation rules 522. Client 504 includes local data store 512 having a copy of global data 520' and client-specific data 524. The copy of global data 520' includes a copy of transformation rules 522'.

In the illustrated embodiment, global data 520 is defined and stored in global data store 510. In addition, transformation rules 522 are defined and stored in global data 520. Global data 520, including transformation rules 522, is then replicated to client 504, such that local data store 512 includes a copy of global data 520' and a copy of transformation rules 522'.

In one embodiment, once global data 520', including transformation rules 522', has been stored on client 504, client 504 generates client-specific data 524. To do so, client 504 reads transformation rules 522' and applies the transformation rules to global data 520'. This generates client-specific data 524, which is stored in local data store 512. Client 504 then uses client-specific data 524 to perform tasks relating to the data.

In an alternate embodiment, client-specific data 524 is generated by server 502. In this embodiment, global data 520 does not need to be replicated to client 504, and therefore global data 520 is not stored within local data store 512. Rather, server 502 reads transformation rules 522 from global data store 510. After transformation rules 522 have been read, server 502 applies the transformation to global data 520 to generate client-specific data 524 which is communicated to client 504. In some embodiments, the transformation is applied to the global data 520 by server 502 upon receipt of a request from client 504 for the data. Client 504 stores the client-specific data 524 in local data store 512. Client 504 then uses client-specific data 524 to perform tasks relating to the data. Therefore, it can be seen that one of the benefits of storing transformation rules 522 in global data 520 is that the transformation rules 522 may be applied by either server 502 or client 504.

Some embodiments benefit from having transformation rules stored in global data store 510, rather than local data store 512. One of these benefits is the ability to compute a Resultant Set of Policy (RSoP) for a client without having to access the client. RSoP is an administrative tool used to manage a Group Policy. The RSoP tool operates as a query engine that polls existing policies, and then reports the results of the query. Administrators can use the RSoP tool, for example, to predict the cumulative effect of Group Policy objects (GPOs), or to determine the actual result of Group Policy settings on a particular computer, user, or user on a computer. When the transformation rules are stored in global data store 510 and applied by server 502, server 502 contains the information needed by the RSoP tool.

Another advantage is the ability to globally manage the rules for multiple clients. Rather than requiring that transformation rules be maintained separately on each individual client 504, the global data 520 can be adjusted to manage multiple clients. In addition, by storing the transformation rules in the global data store, the transformation rules cannot be modified by the client, unless the client is given permission to modify the global data store. Another benefit of storing transformation rules in the global data store is that it enables the server to apply the transformation rules before passing the data to the client. This enables the server to ensure that the transformation rules are being applied, and that the transformation rules are being applied properly. This is beneficial, for example, when information in global data 520 is secure or private, and should not be read or received by client 504.

In another possible embodiment, transformation rules 522 are applied by both server 502 and client 504. In this embodiment, transformation rules 522 are divided into two or more sets of transformation rules, namely a server set of transformation rules and a client set of transformation rules. The server set of transformation rules is first applied to global data 520 by server 502 to generate transformed global data that is communicated to client 504. After receiving the transformed global data, client 504 applies the client set of transformation rules to the transformed global data to generate client-specific data 524. Client-specific data 524 is then stored in local data store 512.

One of the benefits of this embodiment is that transformations may be applied by the computing system best suited to perform the transformation. Some transformations are best suited to being performed by the server. For example, server 502 may choose to apply or not apply a transformation based on the authentication method used by client 504. In an even more specific example, server 502 first determines whether the client has authenticated using Kerberos authentication. If so, the transformation is applied. For clients authenticating using NTLM or for anonymous clients, the transformation is not applied.

Other transformations are better suited to being performed by the client. For example, if a transformation rule is predicated by a value of a registry key stored on the client, it would be difficult for server 502 to perform that transformation. In that case, the transformation may instead be performed by the client.

Figure 6:
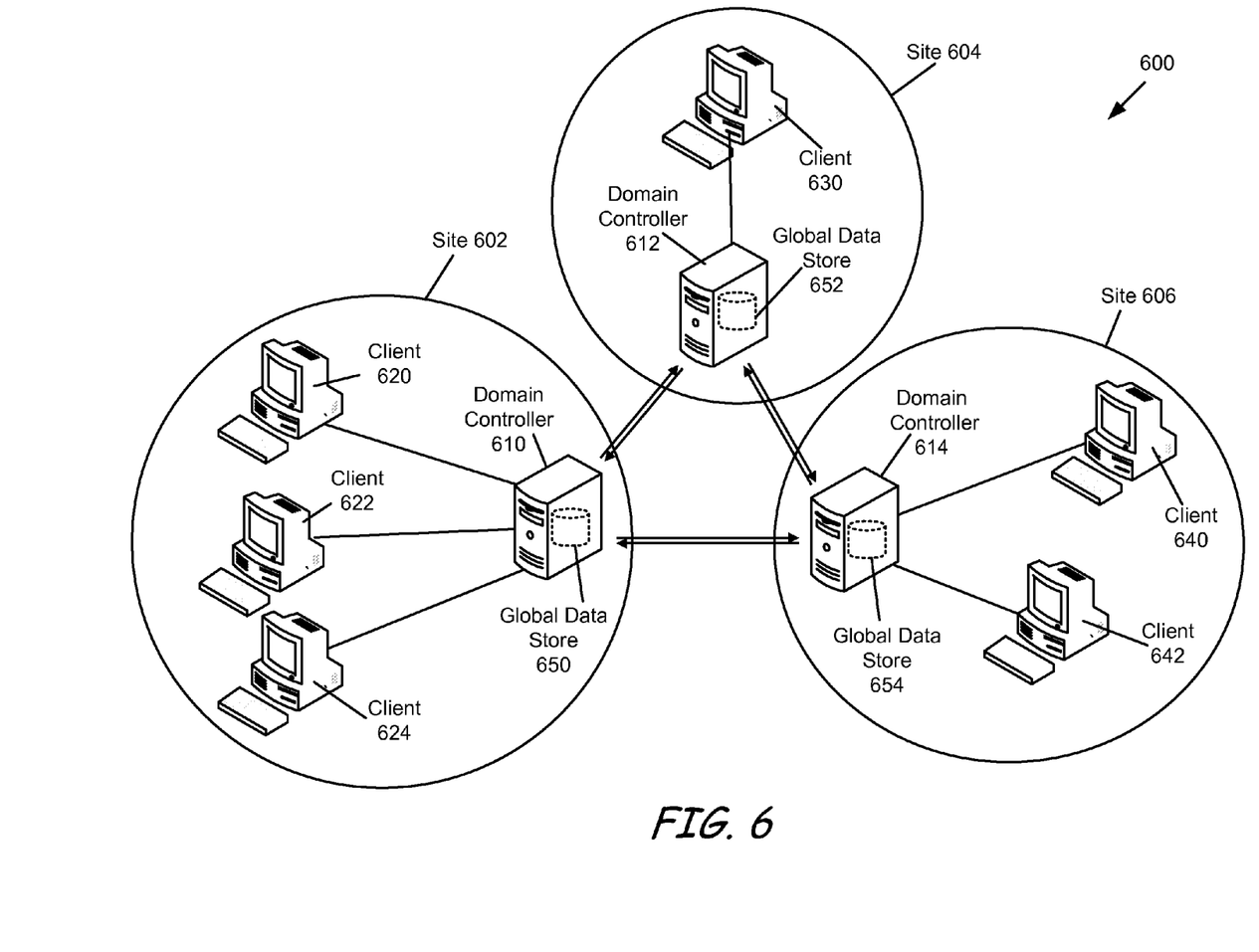
FIG. 6 is a block diagram of an example client-server system capable of implementing aspects of the present disclosure.

FIG. 6 is a block diagram of an example client-server system 600. Client-server system 600 operates a Microsoft® Windows® environment including an Active Directory® directory service. In the illustrated example, client-server system 600 includes sites 602, 604, and 606. Sites are commonly defined within an organization to group computers sharing a common location. For example, each of sites 602, 604, and 606 may be located in a different building, or in a separate city. The present disclosure is not, however, limited to client-server systems having multiple sites.

In the illustrated example, each of the sites includes one or more domain controllers. For example, site 602 includes domain controller 610, site 604 includes domain controller 612, and site 606 includes domain controller 614. In addition, each domain controller is in data communication with one or more clients. For example, domain controller 610 is in data communication with clients 620, 622, and 624; domain controller 612 is in data communication with client 630; and domain controller 614 is in data communication with clients 640 and 642.

Domain controllers 610, 612, and 614 each have a global data store 650, 652, and 654, respectively. Global data stores 650, 652, and 654 are replicated, such that changes made to one of the global data stores will automatically be made to the other global data stores.

Figure 7:
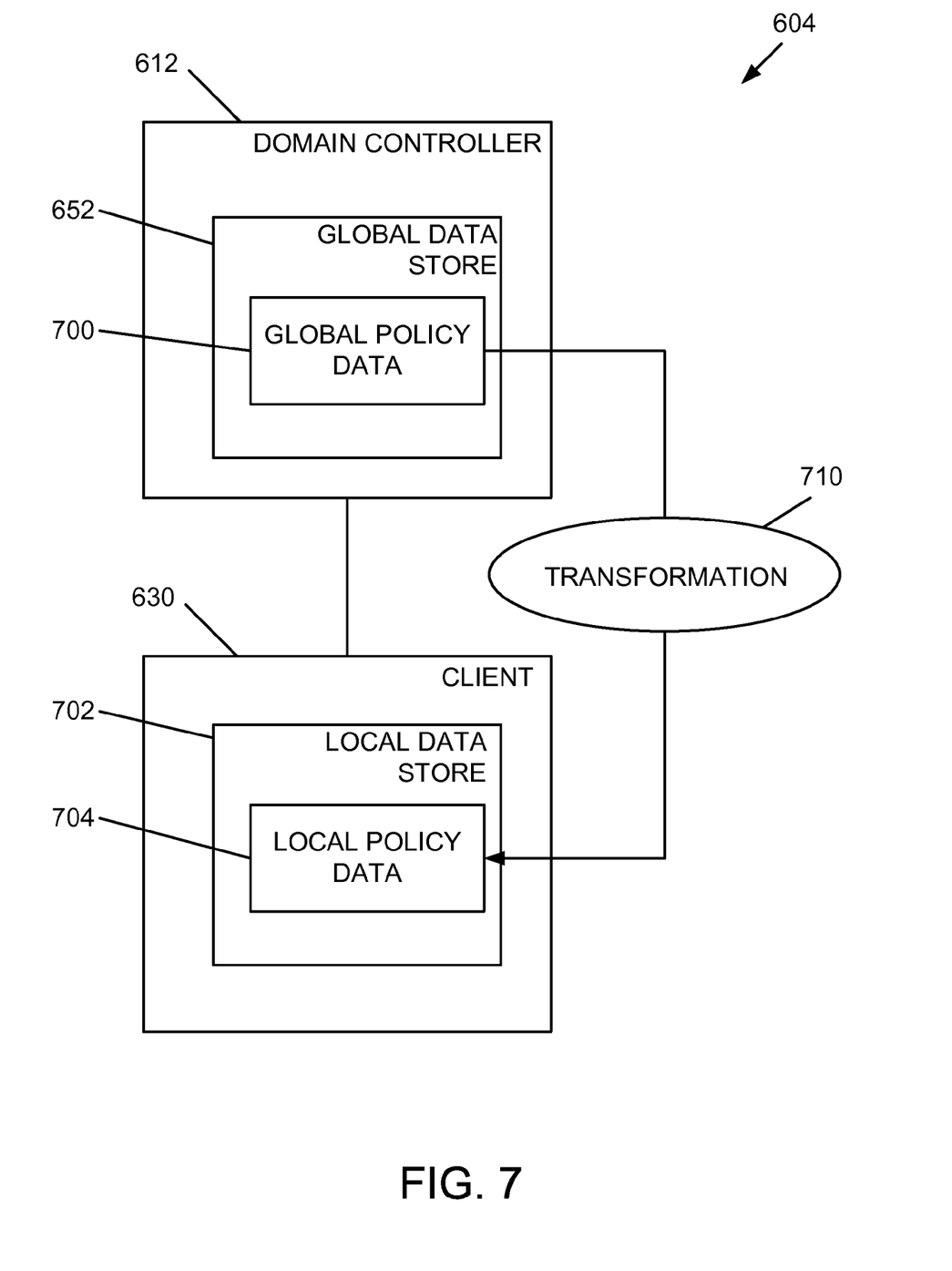
FIG. 7 is a block diagram further illustrating a portion of the client-server system shown in FIG. 6.

FIG. 7 is a block diagram further illustrating site 604 of example client-server system 600, such as shown in FIG. 6. Client-server system 600 includes domain controller 612 and client 630. Domain controller 612 includes global data store 652. Global polity data 700 is stored in global data store 652. Client 630 includes local data store 702 having local policy data 704.

In one embodiment, domain controller 612 is a server that responds to security authentication requests. In this embodiment, client 630 is any computing system in which it is desirable to specially configure a local policy to differ from the global policy. In some embodiments, client 630 is itself a domain controller. In such embodiments, client 630 may receive the replicated global data store.

In one embodiment, global policy data 700 is defined by a set of data objects, each object includes an unordered set of attributes, and each attribute represented by an unordered set of distinct values. Possible embodiments include global policy data 700 that conforms to the lightweight directory access protocol (LDAP). Global policy data 700 is replicated throughout client-server system 600 to define enterprise-wide policies.

It is sometimes desirable, however, to define a local policy that differs from the global policy. One example of this is in defining a set of local administrators. The global set of administrators is defined in the global data store (such as a database of an Active Directory directory service). Local policy data 704 is generated from global policy data 700 by applying a transformation 710 to global policy data 700. The resulting local policy data 704 includes, for example, a customized set of administrators that is stored on local data store 702. Any other local policies may be similarly defined by applying a transformation to global policy data 700. In one embodiment, local policy data 704 is registry data, such that it is stored within the Microsoft® Windows® registry. Once the local policy data 704 has been generated, client 630 applies that policy to evaluate security authentication requests, or for any other desired purpose.

Figure 8:
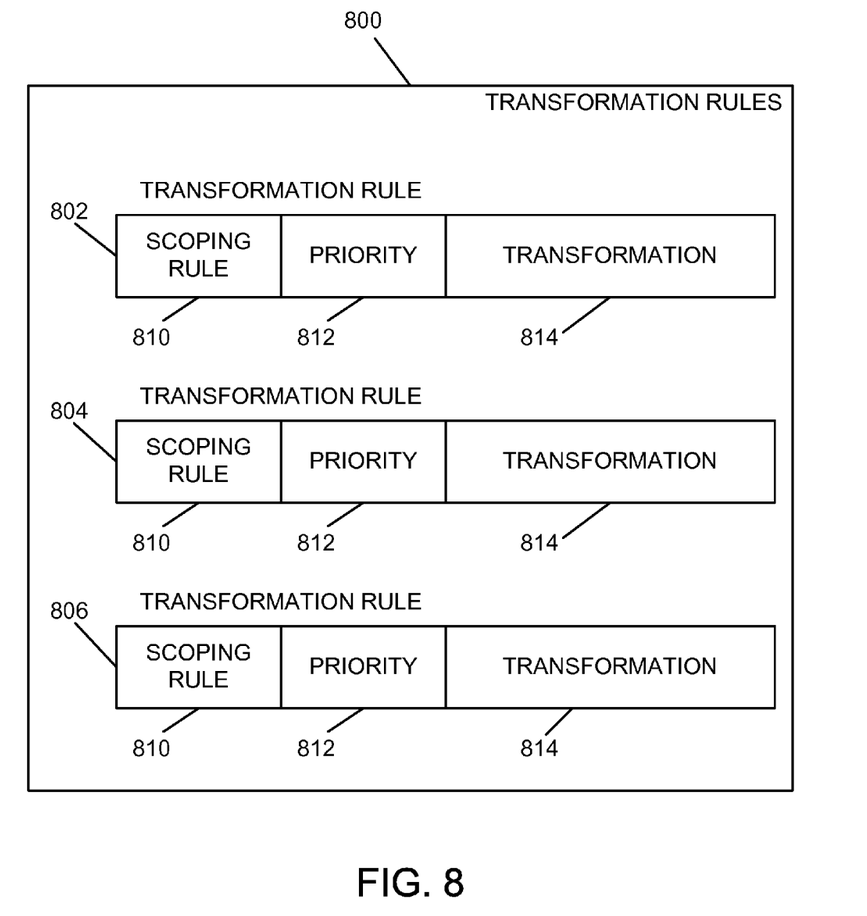
FIG. 8 is a block diagram illustrating an example data structure for transformation rules.

FIG. 8 is a block diagram illustrating an example data structure for transformation rules 800. In the illustrated embodiment, one or more transformation rules 800 include first transformation rule 802, second transformation rule 804, and third transformation rule 806. Transformation rules 800 can include any number of transformation rules 802, 804, 806, etc. Each transformation rule 802, 804, and 806 includes scoping rules 810, priority 812, and transformation 814.

Scoping rule 810 includes one or more rules that define the set of clients to which the transformation rule will apply. In one embodiment, scoping rule 810 is a list of one or more clients. In another embodiment, scoping rule 810 includes a set of Boolean predicates based on client properties such as client name, organizational unit membership, security group membership, or other client attributes including dynamic attributes such as a client's Internet Protocol ("IP") address, as well as global system properties such as time of day. An example of a relatively complex scope rule is a transformation that applies on Fridays between 5 pm and 9 pm PST, for clients located in the site having the name "Building 11."

If transformation rules 800 are stored locally on a client, and not in a global data store, then scoping rule 810 may be implicitly defined as applying only to the particular client. Therefore, scoping rules 810 are not required in all embodiments.

Priority 812 identifies a relative priority of the transformation rule as compared with other transformation rules. In one embodiment, priority 812 is an integer value where the value "1" has the highest priority. If two transformation rules were defined having the same priority, a default priority rule may be applied to determine the priority. An example of a default priority rule is to process any conflicting transformation rules in the order in which they are defined. For example, if transformation rule 1 and transformation rule 2 were listed with the same priority, transformation rule 1 would be applied first because it is listed first. In another embodiment, all transformation rules are treated as having the same priority and priority 812 is not required. Alternatively, a default priority rule may apply if priority 812 is not included.

Transformation 814 includes the actual transformation that is to be applied to the global data. Some embodiments define transformations that may be applied to an object, an attribute of an object, or a value of an attribute. In one example, transformation 814 is selected from one of: object override, attribute override, value exclusion, and value extension.

Object override is a transformation to override a value of a global object. Object override completely replaces an object with a client-specific object and attributes. Object override may also be used to remove an object, such as by overriding the object with a NULL value. In addition, object override may be used to introduce a new object by overriding a nonexisting global object with a specific value. For example, object override may be used to replace the set of administrators defined in directory service domain with a set of client-specific administrators.

Attribute override is a transformation to override an attribute of a global object or set of objects. Attribute override overrides the attribute with a client-specific value. For example, attribute override is used to specify a set of Backup Operators for a domain controller, unrelated to the global setting for Backup Operator membership.

Value exclusion is a transformation to remove a value or a set of values from an attribute of a global object or set of global objects. For example, value exclusion is used to exclude a specific user from the globally defined set of Backup Operators for a specific domain controller.

Value extension is a transformation to add a value or set of values to an attribute of a global object. For example, value extension is used to add a specific user to a globally defined set of Backup Operators.

The transformations described herein are examples only. In other embodiments, other transformations can be applied. For example, a Boolean or other complex expression can be used to define a transformation rule. One example involves the Lightweight Directory Access Protocol ("LDAP"). The LDAP includes a policy called MaxPageSize. The policy is a global policy controlling a parameter of LDAP server processing. The value of the parameter is an integer. As a result, a possible transformation rule could be defined as: LocalValue=min(GlobalValue, 1000), where LocalValue is the local data and GlobalValue is the global data. This example puts a limit on ceiling on the GlobalValue to ensure that LocalValue never excees 1000, even if the GlobalValue is larger. A wide variety of transformations could be defined in a similar manner.

Another example of a possible transformation involves string manipulation. In this example, the global policy data includes a message, such as a message that is displayed to a user at logon. A transformation rule can be defined to change the message. For example, an additional message is appended to the end. This is useful, for example, if there is a need to convey information to a specific individual or group of individuals. If the user is an administrator, for example, the transformation rule might append, the message might include a reminder that the user will be automatically logged off after a period of inactivity. Any other modification could be made to a message, such as deleting, inserting, or otherwise modifying a message.

In some embodiments, global and local policies are defined in Extensible Markup Language ("XML"). In some of these embodiments, transformation rules are expressed as an Extensible Stylesheet Language ("XSL") template, defining how the XML should be transformed.

These and other data transformations may be applied to global data to generate client-specific data that meets the needs of the particular client, or set of clients. In this way, a widely distributed data store need not be confined to the rigid requirement that all replicated data stores contain exactly the same data. In some embodiments, the data transformations enable computing systems to have greater flexibility and functionality within a computing network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a server communicatively connected to a global data store, the global data store containing global data including at least one global object comprising at least one attribute represented by a set of values; and
    wherein the server is operative to transfer to a client a complete copy of the global data and at least one transformation rule, the at least one transformation rule configured to be used by the client to generate client-specific data from the complete copy of the global data, wherein the client-specific data is to be stored in a local data store of the client to the global data, wherein the at least one transformation rule is further configured to transform a global set of administrators identified in the complete copy of the global data into a client-specific set of administrators different from the global set of administrators, the at least one transformation rule including:
    a scope including one or more rules configured to assign the at least one transformation rule to the client, the one or more rules selected from a group comprising: a list of one or more clients; Boolean predicates specific to properties of the client including client name; organizational unit membership; and security group membership;
    a priority configured to prioritize the at least one transformation rule with respect to other transformation rules; and
    a transformation that defines an operation applied to the at least one global object, wherein the transformation includes at least one of:
    an object override configured to replace the global set of administrators with the client-specific set of administrators;
    a value exclusion configured to remove one or more administrators from the global set of administrators; and
    a value extension configured to add one or more administrators to the global set of administrators.

2. The system of claim 1, wherein the global data is global policy data.

3. The system of claim 2, wherein the client-specific data is client-specific policy data.

4. The system of claim 1, wherein the server is a domain controller.

5. The system of claim 4, wherein the transformation rule is stored in the global data store.

6. The system of claim 4, wherein the transformation rule is stored in the local data store.

7. A computer storage medium containing computer executable instructions which when executed by a computer perform a method of generating client-specific data, the method comprising:
    storing global data in a memory of a computing device including at least one global object comprising at least one attribute represented by a set of values;
    storing transformation rules in the memory of the computing device, including at least one transformation rule configured to transform a global set of administrators into a client-specific set of administrators different from the global set of administrators, the at least one transformation rule including:
    a scope including one or more rules configured to assign the at least one transformation rule to one or more clients, the one or more rules selected from a group comprising: a list of one or more clients; Boolean predicates specific to properties of each of the one or more clients including client name; organizational unit membership; and security group membership;

a priority configured to prioritize the at least one transformation rule with respect to remaining transformation rules; and a transformation that defines an operation applied to the at least one global object, wherein the transformation includes at least one of:

an object override configured to replace the global set of administrators with the client-specific set of administrators;

a value exclusion configured to remove one or more administrators from the global set of administrators; and a value extension configured to add one or more administrators to the global set of administrators;

applying with the computing device the transformation rules to the global data in an order corresponding to the priority to generate client-specific data; and storing the client-specific data in the memory of the computing device the client-specific data configured to be used by a client of the one or more clients that is within the scope of the transformation rules.

8. The computer storage medium of claim 7, wherein applying the transformation rules to the global data is performed by a server.

9. The computer storage medium of claim 7, wherein applying the transformation rules to the global data is performed by the client of the one or more clients after receiving the global data from a server.

10. The computer storage medium of claim 7, wherein applying the transformation rules to the global data is performed by a domain controller.

11. The computer storage medium of claim 7, wherein storing the client-specific data comprises storing the client-specific data in a registry of the client of the one or more clients.

12. The computer storage medium of claim 7, wherein defining global data comprises defining a policy.

13. The computer storage medium of claim 7, wherein storing the client-specific data comprises storing the client-specific data on a local data store of the client of the one or more clients.

14. The computer storage medium of claim 7, wherein the transformation rules are divided into a server set of transformation rules and a client set of transformation rules.

15. The computer storage medium of claim 7, wherein the global data conforms to a lightweight directory access protocol.

16. A directory service database comprising:

a first domain controller having a global data store containing global policy data, wherein the first domain controller distributes the global policy data;

a second domain controller storing transformed global policy data used to determine access rights, wherein the transformed global policy data is generated by applying a transformation rule to the global policy data comprising transforming a global set of administrators into a client-specific set of administrators different from the global set of administrators; and a local data store communicatively connected to the second domain controller, the local data store containing transformation rules that are applied to the global policy data by the second domain controller to generate transformed global policy data, wherein each of the transformation rules comprise:

a scope including one or more rules configured to assign a respective transformation rule to a client, the one or more rules selected from a group comprising: a list of one or more clients; Boolean predicates specific to properties of the client including client name; organizational unit membership; and security group membership:

a priority configured to prioritize the at least one transformation rule with respect to other transformation rules; and a transformation that defines an operation applied to the at least one global object, wherein the transformation includes at least one of:

an object override configured to replace the global set of administrators with the client-specific set of administrators;

a value exclusion configured to remove one or more administrators from the global set of administrators; and a value extension configured to add one or more administrators to the global set of administrators.

17. The directory service database of claim 16, wherein the global data store of the first domain controller is a distributed data store comprising a directory service.

18. The directory service database of claim 16, wherein the global policy data conforms to lightweight directory access protocol.

19. The directory service database of claim 16, wherein the transformed global policy data is registry data stored in a registry.

* * * * *